T. MASON.
REEL.
APPLICATION FILED APR. 17, 1909.
953,479.
Patented Mar. 29, 1910.
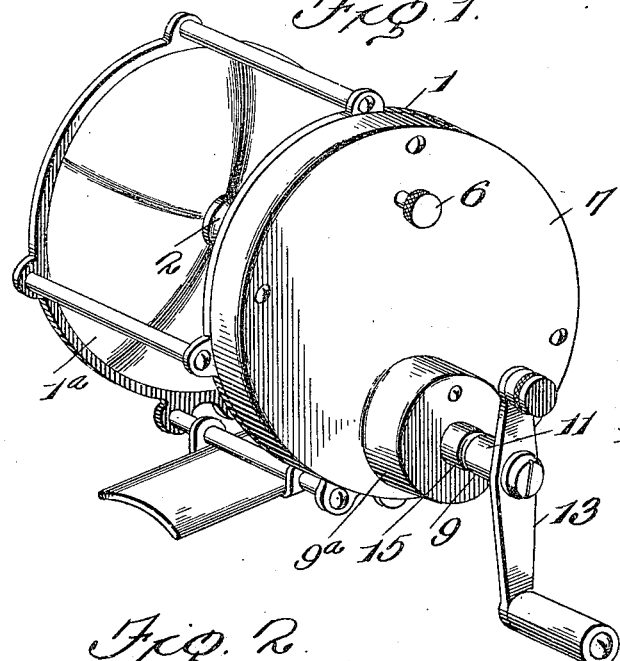
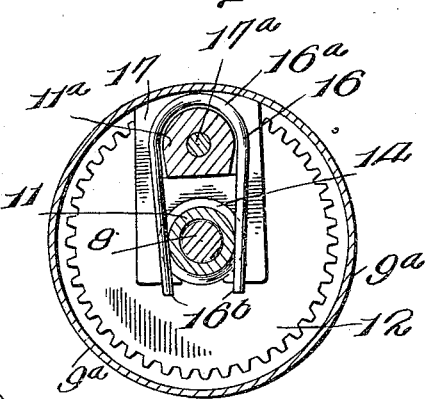
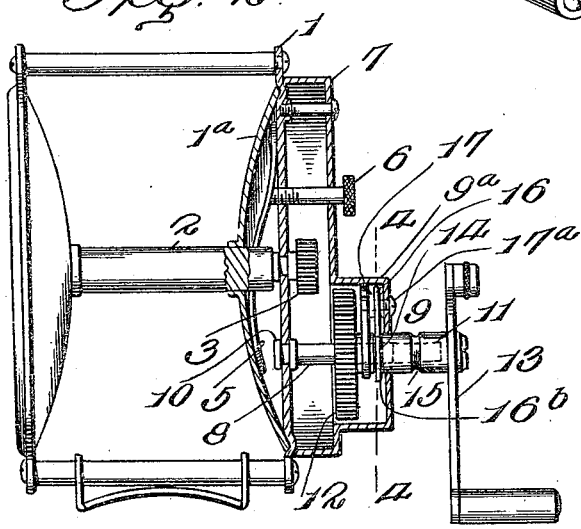
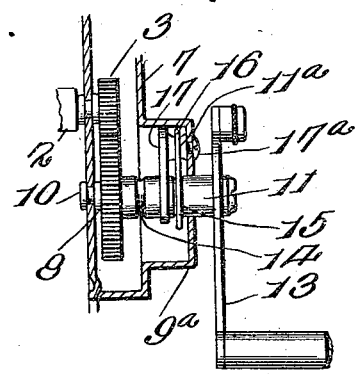
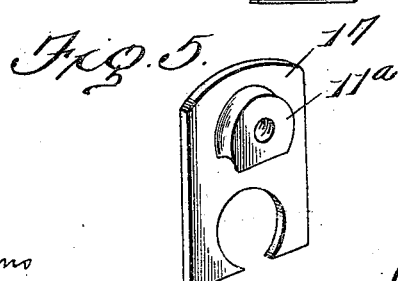
Witnesses.
Ray Williams
M. T. Gray.
Inventor
Thomas Mason
By John Smurie
Attorney
ANDREW B. GRAHAM CO., PHOTO-LITHOGRAPHERS, WASHINGTON, D. C.

UNITED STATES PATENT OFFICE.

THOMAS MASON, OF JACKSONVILLE, ILLINOIS.

REEL.

953,479.  Specification of Letters Patent.  Patented Mar. 29, 1910.

Application filed April 17, 1909. Serial No. 490,636.

*To all whom it may concern:*

Be it known that I, THOMAS MASON, a citizen of the United States, residing at Jacksonville, in the county of Morgan and State of Illinois, have invented certain new and Improvements in Reels, of which the following is a specification.

This invention relates to improvements in fishing reels.

The object of the invention is to provide mechanism, whereby the line may be paid out rapidly, and yet be under perfect control of the fisherman.

According to my invention, I provide a telescopic shaft, on one section of which are grooves with which a spring coöperates to hold the attached gear in relative position, said grooves acting as the means for determining the movement of the shaft.

The invention also comprehends improvements in the details of construction and arrangement of parts, all of which will be hereinafter pointed out in the claims.

In the drawings: Figure 1, is a perspective view of my improved reel. Fig. 2, is a front view partly in section. Fig. 3, is a section after Fig. 2, parts in operative position. Fig. 4, is an enlarged section on line 4—4 Fig. 2. Fig. 5, is a detail perspective view of the plate.

The numeral 1, indicates the casing of a fishing reel having the usual drum or spool 1$^a$, and which forms no part of my present invention.

2, indicates the drum or spool shaft, extending outside the casing and provided with a pinion 3. A curved leaf spring 5, is attached to the inside of the casing 1, and bears against the inner face of the drum or spool 1$^a$, to form a drag. The tension of the curved leaf spring 5, against the drum is regulated by a set screw 6, operating in a threaded opening in the casing and bearing directly on said spring.

Fitted to the outside of the casing 1, in any convenient manner is an auxiliary casing 7, through which the head of the screw 6, extends. Extending from the casing 1, and within the auxiliary casing 7, is the stationary member 8, of a telescopic shaft 9, said member having a shoulder 10. Slidably mounted on the member 8, is a member 11, having secured to its inner end a gear wheel 12, designed to mesh with the pinion 3, and on the outer end of member 11, is a handle 13. The member 11, is provided with two annular grooves 14, and 15. A spring 16, is arranged in the auxiliary casing, and is designed to coöperate with the grooves 14, and 15, to hold the female member 11, of shaft 9, in adjusted position. The spring is located between the wall of an extension 9$^a$, of the auxiliary casing and a plate 17, the latter serving as a means for confining and supporting the spring in position.

The plate 17, is formed with a round open end notched to fit snugly the sleeve 11, and is also provided with a raised portion 11$^a$, to form a base to receive the curved end 16$^a$, of the spring 16. A rivet or the like 17$^a$, passes through the plate 17, and the extension 9$^a$, of the auxiliary casing to hold said plate in position. The spring 16, comprises a single piece of metal bent upon itself to form the curved end 16$^a$, and two forwardly extending arms 16$^b$, which project across the plane of the sleeve 11. The tension of the spring is such as will normally tend to draw the two spring arms 16$^b$, toward each other, hence they will always be in contact with the sleeve. This construction comprises the spring in the compartment formed by the extension 9$^a$, and the plate 17, and it is thereby prevented from becoming loose or in otherwise getting out of order.

In operation, the member 11, is forced inwardly toward the casing 1, to bring the gear wheel 12, in alinement with the pinion 3, so that the drum or spool shaft 2, between the drum may be revolved to wind the line. When the parts are in this position the spring arms 16$^b$, slip into the groove 15, and thereby hold the gears in mesh. When it is desired however to pay out the line, the handle 13, hence the member 11, is drawn away from the casing to the position shown in Fig. 2. The stationary member 8, acts as a journal for the member 11, so as to provide a proper means for guiding the parts in their movement. When in this withdrawn position, the spring arms 16$^b$, slip into the groove 14, and hold the gear out of mesh with the pinion. The grooves are shallow so that but slight force is necessary to disengage the spring when it is necessary to move the member 11, in or out, and yet said grooves must be of sufficient depth to form substantial seats for the spring arms.

The device is simple and it requires little inconvenience to design the gears to permit the drum to freely revolve, as it only requires a slight pull out on the handle as the same is being wound. The device is also efficient in that no separate lever or button is required, in addition to the usual handle to affect engagement or disengagement of the gears, the whole operation being performed while the drum is being revolved.

The special form of device described for causing a drag is of importance, as by the arrangement of the adjusting screw the tension of the spring may be regulated to prevent "backlash" of the drum. Of course it will be understood this feature of the invention may be dispensed with if desired.

The construction of the grooved sliding member of the shaft, and its coöperating spring, is such as to preclude liability of breaking or becoming out of order.

Having described my invention what I claim is—

1. In a reel, the combination with a drum or spool shaft, a gear on said shaft, a telescopic shaft, one member of which is movable and formed with grooves, a pair of spring arms lying across opposite sides of the movable member and adapted to engage either of the grooves, to position the grooved member, and a gear on the grooved member which may mesh with the gear on the drum shaft.

2. In a reel, the combination with a drum shaft, a gear, a telescopic shaft, one member of which is formed with annular grooves, a gear mounted on the grooved member, and movable therewith, and a U-shape spring, the legs of which coöperate with the grooves to hold the gear in or out of mesh.

3. In a reel, the combination with a casing and a shaft, an auxiliary casing, a gear on the shaft, a stationary shaft member in the auxiliary casing, a slidable shaft member having grooves and mounted on the stationary member and limited in its movement in one direction by a shoulder, a gear on the slidable member, said gear meshing with the first mentioned gear when the slidable member is against the shoulder, and a U-shape spring on the inside of the auxiliary casing the legs of which coöperate with the grooves to hold the gears in or out of mesh.

4. In a reel, the combination with a casing and a shaft, an auxiliary casing, a gear on the shaft, a stationary shaft member in the auxiliary casing, a slidable shaft member having grooves and mounted on the stationary member and limited in its movement in one direction by a shoulder, a gear on the slidable member, said gear meshing with the first mentioned gear when the slidable member is against the shoulder, and a spring including two legs on the inside of the auxiliary casing, the legs engaging opposite sides of the slidable shaft member to coöperate with the grooves to hold the gears in or out of mesh, and a partition which with the outer wall of the auxiliary casing forms a compartment for the spring.

5. In a reel, the combination with a casing, a shaft, a pinion on said shaft, a slidable shaft formed with grooves, a gear on the slidable shaft, a spring formed with two yielding arms embracing the shaft to engage with either of the grooves to hold the gear and pinion in or out of engagement.

6. In a reel, the combination with a casing, a shaft, a pinion on the shaft, a slidable shaft formed with grooves, a gear on the slidable shaft, a plate formed with a seat in which slides the slidable shaft, a support intermediate the casing and the plate, and a spring element bent around the support and formed with two extending arms embracing the slidable shaft to fit in either of the grooves thereof to hold the gears in or out of mesh.

In testimony whereof I affix my signature in presence of two witnesses.

THOMAS MASON.

Witnesses:
CHARLES A. BARNES,
WALTER BELLATTI.